(12) United States Patent
Luvizon et al.

(10) Patent No.: US 12,051,150 B2
(45) Date of Patent: Jul. 30, 2024

(54) COMPUTER IMPLEMENTED METHOD AND SYSTEM FOR CLASSIFYING AN INPUT IMAGE FOR NEW VIEW SYNTHESIS IN A 3D VISUAL EFFECT, AND NON-TRANSITORY COMPUTER READABLE STORAGE MEDIUM

(71) Applicant: SAMSUNG ELECTRONICA DA AMAZONIA LTDA., São Paulo (BR)

(72) Inventors: Diogo Carbonera Luvizon, Campinas (BR); Gustavo Sutter Pessurno De Carvalho, Campinas (BR); Otavio Augusto Bizetto Penatti, Campinas (BR)

(73) Assignee: SAMSUNG ELETRONICA DA AMAZONIA LTDA., Campinas (BR)

( * ) Notice: Subject to any disclaimer, the term of this patent is extended or adjusted under 35 U.S.C. 154(b) by 71 days.

(21) Appl. No.: 17/673,351

(22) Filed: Feb. 16, 2022

(65) Prior Publication Data

US 2023/0196659 A1    Jun. 22, 2023

(30) Foreign Application Priority Data

Dec. 21, 2021  (BR) ...................... 10 2021 025992-2

(51) Int. Cl.
*G06T 19/00* (2011.01)
*G06F 3/0482* (2013.01)
(Continued)

(52) U.S. Cl.
CPC .......... *G06T 15/205* (2013.01); *G06F 3/0482* (2013.01); *G06T 9/00* (2013.01);
(Continued)

(58) Field of Classification Search
None
See application file for complete search history.

(56) References Cited

U.S. PATENT DOCUMENTS 7,822,265 B2   10/2010   Berretty
9,195,678 B2   11/2015   Morrison et al.
(Continued)

FOREIGN PATENT DOCUMENTS

EP      2 596 475 B1    1/2019

OTHER PUBLICATIONS

Huang et al. "Semantic view synthesis." Computer Vision-ECCV 2020: 16th European Conference, Glasgow, UK, Aug. 23-28, 2020, Proceedings, Part XII 16. Springer International Publishing, 2020 (Year: 2020).*

(Continued)

*Primary Examiner* — Saptarshi Mazumder
(74) *Attorney, Agent, or Firm* — STAAS & HALSEY LLP

(57) ABSTRACT

A computer implemented method for classifying an input image for new view synthesis in a 3D visual effect, the input image being used to create an image representation comprising a set of target views based on the input 3D visual effect, each target view having an image size of H×W. The method includes computing an image score $s_t$ for the set of target views based on a number of non-occluded pixels in the set of target views, wherein the image score indicates suitability of the input image for new view synthesis in a 3D visual effect. A system and a non-transitory computer readable storage medium for performing said method for classifying an input image for new view synthesis in a 3D visual effect.

16 Claims, 9 Drawing Sheets

(51) Int. Cl.
  *G06T 9/00* (2006.01)
  *G06T 15/20* (2011.01)
  *G06V 10/764* (2022.01)

(52) U.S. Cl.
  CPC ............ *G06T 19/00* (2013.01); *G06V 10/764* (2022.01); *G06T 2200/04* (2013.01); *G06T 2200/24* (2013.01)

(56) References Cited

U.S. PATENT DOCUMENTS

| | | | |
|---|---|---|---|
| 9,390,107 | B2 | 7/2016 | Cohen et al. |
| 9,449,411 | B2 | 9/2016 | Cok et al. |
| 9,741,125 | B2 | 8/2017 | Baruch et al. |
| 9,916,679 | B2 | 3/2018 | Flynn et al. |
| 10,453,249 | B2* | 10/2019 | Smirnov ............ H04N 13/111 |
| 2015/0235408 | A1 | 8/2015 | Gross et al. |
| 2017/0084001 | A1 | 3/2017 | Holzer et al. |
| 2022/0335244 | A1* | 10/2022 | Reddy K ............ G06F 18/41 |

OTHER PUBLICATIONS

Tucker et al. "Single-view view synthesis with multiplane images." Proceedings of the IEEE/CVF Conference on Computer Vision and Pattern Recognition. 2020 (Year: 2020).*

Johannes Kopf et al. "One Shot 3D Photography", ACM Trans. Graph., vol. 39, No. 4, Jul. 2020.

Tinghui Zhou et al. "Stero Magnification: Learning view synthesis using multiphase images", ACM Trans. Graph., vol. 37, No. 4, Aug. 2018.

Richard Tucker et al. "Single-View View Synthesis with Multiplane Images", CVPR 2020 Paper, IEEEE Xplore.

* cited by examiner

COMPUTER IMPLEMENTED METHOD AND SYSTEM FOR CLASSIFYING AN INPUT IMAGE FOR NEW VIEW SYNTHESIS IN A 3D VISUAL EFFECT, AND NON-TRANSITORY COMPUTER READABLE STORAGE MEDIUM

CROSS-REFERENCE TO RELATED APPLICATION(S)

This application is based on and claims priority under 35 U.S.C. § 119 to Brazilian Patent Application No. BR 10 2021 025992-2, filed on Dec. 21, 2021, in the Brazilian Intellectual Property Office, the disclosure of which is incorporated by reference herein in its entirety.

FIELD OF THE DISCLOSURE

The present invention relates to a new method for classifying a candidate image for generating novel views considering a 3D representation. The candidate image is classified by computing an image score based on the number of non-occluded pixels in the set of target views generated by an image representation of the candidate image.

DESCRIPTION OF RELATED ART

Novel view synthesis from a single image is an important technology that enables many new applications related to 3D effects and augmented and virtual reality for electronic devices equipped with a digital display, such as Smartphones, Smart TVs, Tablets, among many others. This technology provides to the user a perception of depth, even from a single and static picture.

Synthesizing novel views from a single image is a hard task, since the input image is a 2D projection of a 3D scene. The geometry of the scene can be partially recovered and represented by a depth map, which encodes the depth information of each image pixel with respect to the camera viewpoint. However, even when precise depth information is available, rendering an image from different viewpoints can result in missing image regions. This effect happens due to occluded regions in the original image that suffers disocclusion when the viewpoint changes.

For handling disocclusion cases, two approaches can be generally employed: modifying the depth map in order to avoid disocclusions or filling in the missing image regions with artificially generated image content. The first approach could result in geometric distortions and cannot be applied effectively into scenes with complex geometric structure. The second approach has the challenge of generating artificial image content that imitates real images. This approach is broadly used in the prior art, especially after the recent advances in artificial neural networks for image inpainting.

Even though artificial neural networks could be employed to fill in missing image regions, this strategy has two drawbacks. First, it is computationally expensive and demands high computational requirement for running complex neural networks with low latency, which prevents this strategy of being used in real time for most of the applications. Second, filling in the missing image regions individually for each new viewpoint may result in visual incoherence among different viewpoints, making this strategy not suitable for augmented and virtual reality applications.

These limitations hinder the use of similar strategies for image inpainting after rendering. Therefore, the most common solution is to generate an intermediate representation that encodes simultaneously the original image, the geometric structure of the scene, and the artificially generated image content for occluded regions.

Among the many possible representations, the most common are point clouds, layered depth images (LDI), surface meshes, and multiplane images (MPI). Rendering point clouds, however, is a computationally expensive process, which is prohibitive for high-resolution images on scenarios with hardware constrains. The LDI representation was proposed to represent a 3D scene with low memory requirements compared to point clouds, but also results in novel views with lower image quality. Surface meshes with color textures are a powerful representation that allows encoding scenes with complex geometry while providing a good trade-off of quality and computational requirements. However, generating a mesh from a single image is a complex process.

Differently from the aforementioned cases, MPI is a simple representation that results in satisfactory results when estimated from a single image such as in the document entitled "Single-View View Synthesis with Multiplane Images", by Tucker and Snavely (CVPR 2020). Another advantage of MPI is its simple rendering process, which requires only planar homographic transformations and RGB-alpha image compositing.

However, synthesizing plausible visual content for images from different modalities is still an open problem. This limitation hinders the capability of current methods to synthesize novel views from a single image that look like real images. Considering the task of inpainting occluded image regions, some pictures are more challenging than others are, since the more pixels request image inpainting, the more difficult is to synthesize new views that seem realistic and natural.

There are some prior art techniques tackling the task of artificially generating novel views has been traditionally approached considering multiple views as input, where the main goal is to create a representation that is capable of generalizing for different target viewpoints, considering a limited set of source viewpoints.

For example, in "DEEPSTEREO: LEARNING TO PREDICT NEW VIEWS FROM REAL WORLD IMAGERY" (U.S. Pat. No. 9,916,679 B2), a model is trained with large-scale data for learning to produce novel views from a set of input posed images, and in "ARTIFICIALLY RENDERING IMAGES USING VIEWPOINTS INTERPOLATION AND EXTRAPOLATION" (US20170084001A1), a method is proposed to generate a third view of the scene by gathering information from two source images. A similar approach can be employed to learn an MPI representation, as in document entitled "Stereo Magnification: Learning view synthesis using multiplane images", by Zhou et al. (SIGGRAPH 2018). Since several calibrated input images are used during inference, the referred methods benefit from stereo vision, therefore, depth information and occluded texture can be inferred more effectively. The main limitation of these strategies are the requirement for several and calibrated input views, which is frequently not available for general use cases.

A more challenging task is to generate novel views from a single image. This problem requires estimating the geometric information as well as the color texture for occluded regions from only one monocular view. Methods have been proposed for this task considering segmentation masks, as in "PARALLAX DEPTH RENDERING" (US20150235408A1), or simple foreground and background segmentation, as in "METHOD AND SYSTEM OF BACKGROUND-FOREGROUND SEGMENTATION FOR IMAGE PROCESSING" (US9741125B2a). However, such approaches fail to provide a real 3D perception of the scene since they are based on a very few planar layers. A different strategy is to learn an MPI representation from single views considering monocular depth estimation, as in the document entitled "Single-View View Synthesis with Multiplane Images", by Tucker and Snavely (CVPR 2020). In a similar way, a 3D mesh representation can be obtained from a single image, as in document entitled "One Shot 3D Photography", by Kopf et al., (SIGGRAPH 2020). Although these methods are capable of producing impressive results for some cases, they are still limited by the quality of the generated images in the occluded regions. This limitation becomes more relevant for images that are more challenging, in general images that have a higher number of pixels in disoccluded regions for a given effect.

Related to general image ranking or image classification, several techniques have been proposed in the last few years. An important task is to rank images from a gallery, where the images should be automatically organized accordingly to their relevance. For example, in "RANKING IMAGE IMPORTANCE WITH A PHOTO-COLLAGE" (U.S. Pat. No. 9,449,411B2) a system capable of automatically ranking a plurality of images accordingly to two or more attributes is described, where the main goal is to result in a photo-collage output.

A related problem is to provide image selection from a set of images, considering a given set of source images. This classic problem can be handled by traditional clustering algorithms, as in "AUTOMATIC SELECTION OF DIGITAL IMAGES FROM A MULTI-SOURCED COLLECTION OF DIGITAL IMAGES" (U.S. Pat. No. 9,195,678 B2) and in "SYSTEM AND METHOD FOR AUTOMATICALLY CREATING A PHOTO CALENDAR" (U.S. Pat. No. 9,390,107B2). Such clustering strategy is tied to the visual content of the image. For example, for a query image from a landscape scene, it is expected to have selected images that are similar in some ways to the provided landscape picture. Differently, in the case of the present invention, the goal is to rank images considering a target 3D visual effect and not some reference images.

The main challenge related to new view synthesis from a single image is in artificially filling in the holes in the new rendered views. For this, two strategies could be adopted: pre-processing the depth map in order to avoid generating holes in the target viewpoint; or generating textures for the missing image regions, as described in "FILLING DISOCCLUSIONS IN A VIRTUAL VIEW" (EP 2596475B1). Filtering strategies are proposed to reduce the artifacts produced by depth-based rendering, as in "GHOST ARTIFACT REDUCTION FOR RENDERING 2.5D GRAPHICS" (U.S. Pat. No. 7,822,265B2). However, independently on the method, when rendering a monocular image based on depth information to a different viewpoint, artifacts could be produced due to the missing information on occluded regions.

As can be seen, many different strategies based on artificial color texture generation could be used to inpaint the image representations to avoid exposing holes in the newly generated view. However, these strategies are either computationally expensive or results in images that do not seem realistic or natural.

In addition, an application or product targeted to produce visually plausible and pleasant novel views for a high diversity of input images would need to pre-select, filter or rank the images that have more adequate content for such visual effect.

Therefore, the state of the art lacks a solution capable of helping the process of generating a good 3D visual effect from an image. Analogously, the state of the art lacks a solution capable of selecting a good visual 3D effect for a given image, so that the resulting 3D visual effect would have good results for a given image.

SUMMARY OF THE INVENTION

Considering the aforementioned limitations and difficulties related to new view synthesis from a single image, the problem this invention aims at solving is the task of ranking and selecting image candidates for new view synthesis from a single image, considering a given 3D visual effect.

In order to achieve this, the present invention proposes a computer implemented method for classifying an input image for new view synthesis in a 3D visual effect, the input image being used to create an image representation comprising a set of target views based on the input 3D visual effect, each target view having an image size of H×W. The method further comprising computing an image score $s_t$ for the set of target views based on the number of non-occluded pixels in the set of t target views, wherein the image score indicates the suitability of the input image for new view synthesis in a 3D visual effect.

The present invention also relates to a system and a non-transitory computer readable storage medium adapted for performing said method for classifying an input image for new view synthesis in a 3D visual effect.

According to an alternative embodiment of the invention, a method for ranking and classifying a plurality of images for new view synthesis is proposed. A set of images can be ranked for a given 3D visual effect, wherein the images ranked first are more suitable for a given visual effect than the images ranked latter, i.e., the images ranked first have smaller image regions of disocclusions or, in an analogue manner, larger regions of non-disocclusions.

The inverse problem can also be handled according to another embodiment the present invention. Considering a set of 3D visual effects and a single given image, each individual visual effect can be ranked to the specific given image, therefore the best visual effect could be applied to the given image, in order to minimize the amount of image disocclusions exposed during the visual effect.

In order to avoid confusion, hereinafter, we refer to the term non-disocclusion score simply as image score, where the higher the image score, the lower the amount of disoccluded image pixels. In other words, images or effects with higher scores are better.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is explained in greater detail below on the basis of figures.

DETAILED DESCRIPTION OF THE INVENTION

The present invention aims at providing a new method for selecting images that are more suitable than others for generating novel views for a 3D visual effect. For this, we propose a new method for ranking and classifying candidate images considering a given 3D visual effect.

In order to achieve this, the present invention proposes a computer implemented method for classifying an input image for new view synthesis in a 3D visual effect, the input image being used to create an image representation comprising a set of target views based on the input 3D visual effect, each target view having an image size of H×W. The method further comprising computing an image score $s_t$ for the set of target views based on the number of non-occluded pixels in the set of target views, wherein the image score indicates the suitability of the input image for new view synthesis in a 3D visual effect.

For this, we consider novel view synthesis as a process that relies on generating an image representation that encodes depth and color, for instance, as in a multiplane image representation (MPI) or in a colored shape representation, which then can be rendered from different viewpoints. Such image representations are frequently composed of pixels from the source image and pixels synthesized by an image generator, which correspond to the inpainted pixels.

In addition, the image representation also contains geometric properties such as depth information that determines which pixels are exposed when rendered from different viewpoints. For example, in a 3D shape representation, a surface may occlude other regions, depending on the viewpoint. Therefore, the amount of pixels from the occluded regions in the source image that are exposed for a given viewpoint can be estimated and used to provide a metric of disocclusion. In an analog manner, the amount of pixels in the newly synthesized view coming from the visible parts of the original image derives a metric of non-disocclusion.

The disocclusion or the non-disocclusion metrics can be used to determine which images have a high disocclusion score or a low disocclusion score, which makes possible choosing the best images for a specific visual effect. The disclosed method can be applied to a plurality of different representations commonly used for novel view synthesis from a single image. In addition, the method is also efficient, can be implemented on many different devices equipped with digital displays or cameras, such as Smartphones, Smart TVs, Tablets, etc.

Below, the preferred embodiments of the invention will be described, wherein the image representation is the multiplane image (MPI) representation. However, a person skilled in the art will understand that the present invention may be applied for different image representation techniques.

Figure 1:
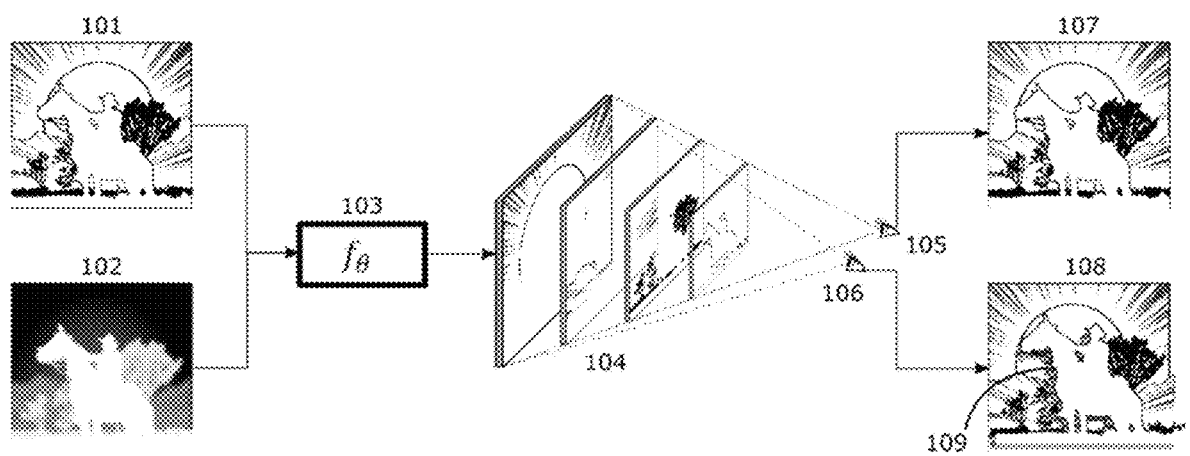
FIG. 1 shows an example of generation of a multiplane image (MPI) representation from a single image and (optionally) a depth map inputs for producing new views of the scene, where cases of image disocclusions are shown, according to an embodiment of the present invention.

FIG. 1 shows an example of generation of a multiplane image (MPI) representation from an image and a depth map inputs for producing new views of the scene with cases of image disocclusions. The multiplane image (MPI) representation is illustrative for the method for ranking and classifying candidate images for a given 3D visual effect, proposed by the preferred embodiment of the present invention.

According to FIG. 1, the MPI representation is defined by a set of D planar image layers as in 104, each layer encoded as an RGB-alpha image at the distance $d_i$ with respect to the viewpoint 105, formally defined by:

$$\{(c_i, \alpha_i)\}_{i=1}^{D} = f_\Theta(I), \quad (1)$$

where $c_i$ and $\alpha_i$ correspond to the color and alpha values of the i-th image layer, $f_\Theta$ represents a generic method 103 that produces an MPI from a single image 101 and optionally from an input depth map 102, and I is the input image 101.

The MPI representation 104 can be rendered to the source viewpoint 105 and to the new viewpoints 106 based on warping and compositing operations. The warping process is defined by a warping function based on the depth of each image plane that can be applied individually for the color and alpha channels, as defined by:

$$c'_i = W_{v_s, v_t}(d_i, c_i), \quad (2)$$

$$\alpha'_i = W_{v_s, v_t}(d_i, \alpha_i), \quad (3)$$

where $c'_i$ and $\alpha'_i$ correspond to the color and alpha values of the i-th image layer after warping from the source viewpoint $v_s$ to the target viewpoint $v_t$, and W is a generic warping function, usually based on planar homography for MPI representation. After warping to the target view, the resulting MPI representation can be rendered by the over composite operation, defined by:

$$I_t = \Sigma_{i=1}^{D} (c'_i \alpha'_i \Pi_{j=i+1}^{D} (1 - \alpha'_j)), \quad (4)$$

where $I_t$ is the new rendered target view.

This results in a new RGB image derived from the composition of the individual image layers in the target view, modulated by the transparency of each alpha channel. When the MPI representation 104 is rendered to the source viewpoint 105, the resulting image 107 has no dissoclusions. However, when the representation is rendered to the target view 106, the resulting image 108 has disoccluded regions 109 exposed due to the warping process.

To implement the ranking strategy, the present invention proposes an image score. The present image score can be computed for a given image and a given set of target viewpoints, which can be determined by a given 3D visual effect. More specifically, the image score is a measure of the amount of image pixels in the source image that do not suffer from disocclusion in the target viewpoints. In addition, a threshold value can also be applied to the image score in order to determine if a given image is suitable for a given 3D visual effect. A formal definition of the image score considering the MPI representation is provided in what follows.

Figure 2:
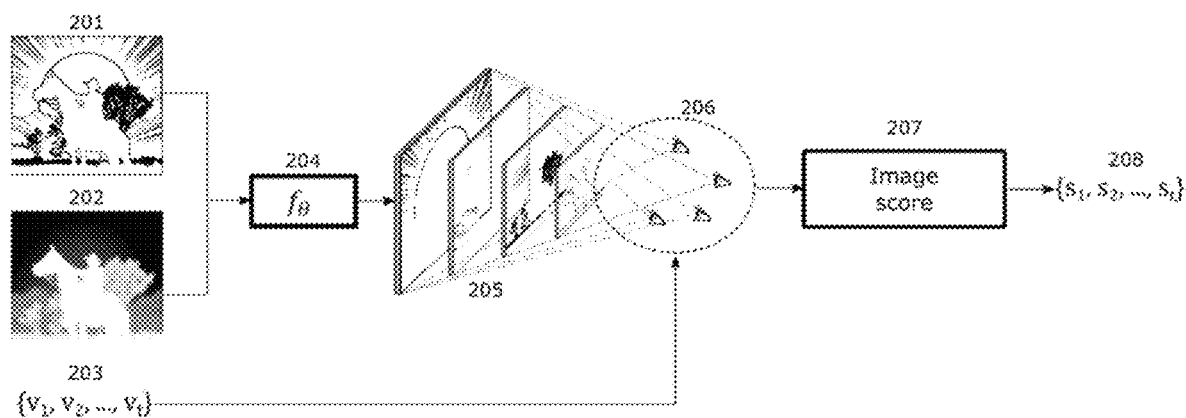
FIG. 2 shows an illustrative example of how the image score is obtained for an input image and a set of target viewpoints, according to an embodiment of the present invention.

FIG. 2 Illustrates how the image score is obtained for an input image and a set of target viewpoints. According to FIG. 2, it is considered that a generic method 204 takes as input an image 201 and (optionally) a depth map 202 to produce an image representation that could be an MPI representation, as in 205. This representation is analyzed accordingly to a set of target views 203, which are defined by an input 3D visual effect. The set of target views 203 can be formally defined by V={$v_1, v_2 \ldots, v_t$}, where t is the number of considered target views. For each sample in V 206, the method proposed by the present invention computes in 207 an image score $s_t$ 208.

In the case of an MPI representation according to the preferred embodiment of the invention, the image score can be computed based on the over composite operation of the warped alpha layers, defined by:

$$M_t = \sum_{i=1}^{D}(\alpha'_i \Pi_{j=i+1}^{D}(1-\alpha'_j)), \quad (5)$$

where $M_t$ is the composite alpha that represents non-occluded pixel values.

In other words, $M_t$ is related to the rendered target view $I_t$, in such a way that where the values in $M_t$ are close to one, the corresponding values in $I_t$ come from the input image, and where the values in $M_t$ are close to zero, the corresponding values in $I_t$ come from occluded regions in the input image.

Therefore, we define a metric for non-disocclusion by the following equation:

$$s_t = \frac{\sum_{k=1}^{H \times W}(M_t(k) \geq \rho)}{H \times W}, \quad (6)$$

which essentially counts the number of non-occluded pixels in the target view, considering an image of size H×W.

In the previous equation, we apply an alpha threshold $\rho$ in order to decide whether or not an alpha value is considered as occluded or non-occluded pixel. Assuming normalized alpha values in [0, 1], the threshold $\rho$ can be set to any value close to and smaller than one for a conservative analysis. In the results section of the present disclosure, some results for different $\rho$ values are shown. It is important to note that the threshold $\rho$ is applied in relation to the pixels of the image, therefore it is not directly related to the desired image score value.

Considering a 3D visual effect described by a set of target views in V, the final image score is given by the following equation:

$$L(\alpha, V) = \left(\frac{1}{|V|}\sum_{k \in V} s_t\right)\min(s_t | t \in V), \quad (7)$$

which summarizes the metric for non-disocclusion considering the average values for a given set of target views, upper bounded by the worst case (lower $s_t$ value).

The resulting score is a scalar value in the interval [0, 1], which can be directly used to compare different images for a given visual effect, or used to compare different visual effects for a given input image. The higher the score, the less pixels are disoccluded, which means that the higher the score, the better the image for the given visual effects or the better the effect for the given image. In other words, images or effects with higher scores are better.

The present invention could be adapted to different applications considering the generation of 3D visual effects from a single image. In what follows, we show how the method for classifying an input image for new view synthesis in a 3D visual effect proposed by the invention could be applied, but not limited, to two different use cases.

Gallery Image Selection for a Desired 3D Visual Effect

Figure 3:
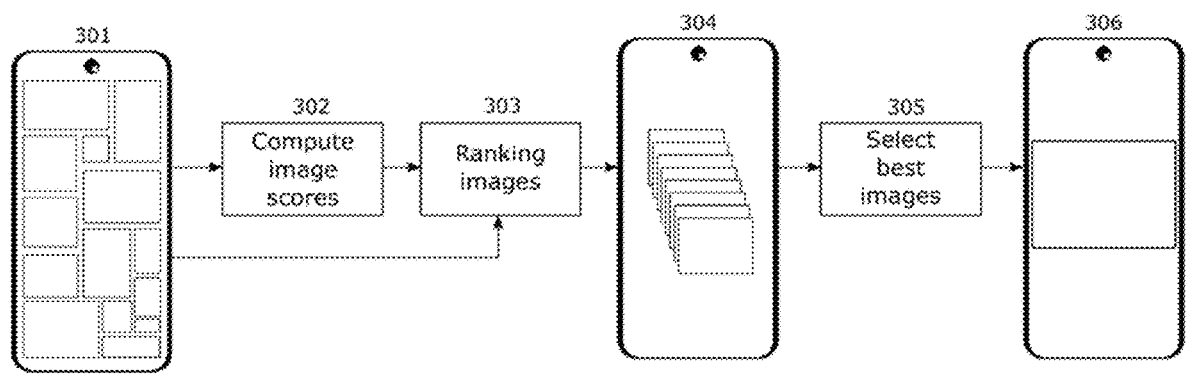
FIG. 3 shows a method for gallery image selection for 3D visual effect generation, which considers a plurality of input images and a fixed 3D visual effect, where the best image is selected based on the image score, according to an embodiment of the present invention.

In this embodiment, the goal is to rank and classify a subset of images from a plurality of images stored in the gallery, memory or database. This use case is illustrated in FIG. 3, which illustrates an alternative embodiment of the invention for gallery image selection for 3D visual effect generation. From a set of images in the gallery 301, the image score is computed in 302 for each image sample, accordingly to a pre-defined 3D visual effect.

This process results in one score value for each image. Then, the images are ranked by decreasing order of their scores in 303, resulting in a list of ranked images in 304 based on their image scores 302.

Preferably, from this set of sorted images, a fixed number of images can be selected in 305 for generating a 3D visual effect animation in 306 based on novel view synthesis.

Alternatively, the method comprises establishing a threshold value for the image score, wherein the input images are suitable for a given 3D visual effect if its imaging score is higher than the threshold value, and then generating 306 a 3D visual effect animation for all the input images having an image score higher than the threshold value.

Realistic 3D Visual Effect for a Desired Image/Picture

The process of generating a 3D photo from a single image consists of producing a 3D visual effect from a single image by simulating a camera movement in the 3D scene. This camera movement can be a simple horizontal or vertical translation in order to produce a visual parallax effect, or could be a more sophisticated 3D motion involving zoom in and out, rotations, pan, till, etc. In this embodiment, the goal is to evaluate a set of possible 3D visual effects, i.e., a set of different target views, for a given input image.

Figure 4:
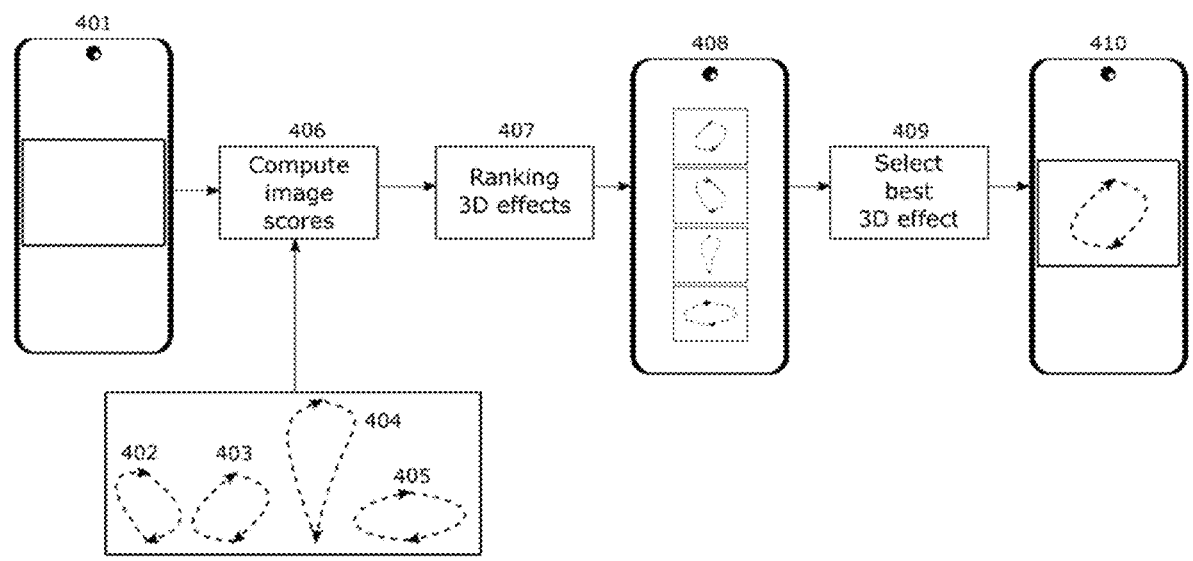
FIG. 4 shows a method for realistic 3D visual effect generation from a single image and from a set of different 3D visual effects, where the best visual effect is selected based on the image score, according to an embodiment of the present invention.

The main idea of this use case is that some 3D effects are more suitable for a given image than others are. For example, effects based on zoom-in should result in better visual quality for an image with a centered object in the scene than an effect with a horizontal translation. This embodiment is illustrated in FIG. 4, which shows the realistic 3D visual effect generation from a single image and from a set of possible 3D effects.

For a given input image 401, a set of possible 3D visual effects identified as 402, 403, 404, and 405, are considered. For each candidate 3D visual effect 402, 403, 404, 405 the input image is used to create an image representation 205 comprising a set of target views 203 based on the input 3D visual effect, as shown in FIG. 2. The image score is then computed in 406 for the input image using each of the candidate 3D visual effects 402, 403, 404, 405 and all the possible visual effects are ranked in 407 accordingly to their image score.

Preferably, the candidate 3D visual effects 402, 403, 404, 405 are ranked in decreasing order, resulting in the possible 3D visual effects in 408. The best candidate 3D visual effects 402, 403, 404, 405 may be displayed to a user for selection in 408. The desired 3D effect is then selected in 409 by the user for displaying the input image as a 3D photo in 410.

Alternatively, the method comprises selecting 409 the candidate 3D visual effect 402, 403, 404, 405 with the highest image score, and then generating 410 the candidate 3D visual effect selected for the input image.

Also, alternatively, the method comprises establishing a threshold value for the image score, wherein the candidate 3D visual effects 402, 403, 404, 405 are suitable for the input image if its imaging score is higher than the threshold value, displaying 408 for a user the 3D visual effect of the input image for all candidate 3D visual effects 402, 403, 404, 405 having an imaging score higher than the threshold value; selecting 409, from the input of the user, a candidate 3D visual effect among the displayed candidate 3D visual effect; and then generating 410 the 3D visual effect animation selected by the user for the input image.

In another alternative, the method comprises establishing a threshold value for the image score, wherein the candidate 3D visual effects 402, 403, 404, 405 are suitable for the input image if its imaging score is higher than the threshold value, and then generating 410 all the 3D visual effect animation for the suitable candidate 3D visual effects 402, 403, 404, 405 for the input image.

The example embodiments described herein may be implemented using hardware, software or any combination thereof and may be implemented in one or more computer systems or other processing systems. Additionally, one or more of the steps described in the example embodiments herein may be implemented, at least in part, by machines. Examples of machines that may be useful for performing the operations of the example embodiments herein include general purpose digital computers, specially-programmed computers, desktop computers, server computers, client computers, portable computers, mobile communication devices, tablets, and/or similar devices.

For instance, one illustrative example system for performing the operations of the embodiments herein may include one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage.

Therefore, the present also related to a system for classifying an input image for new view synthesis in a 3D visual effect, characterized by comprising a processor, and a memory comprising computer readable instructions that, when performed by the processor, causes the processor to perform the method described in this disclosure.

The system may also include software resident on a storage media (e.g., a disk drive or memory card), which, when executed, directs the microprocessor(s) in performing transmission and reception functions. The software may run on an operating system stored on the storage media, such as, for example, UNIX or Windows, Linux, Android and the like, and can adhere to various protocols such as the Ethernet, ATM, TCP/IP protocols and/or other connection or connectionless protocols.

As is well known in the art, microprocessors can run different operating systems, and can contain different types of software, each type being devoted to a different function, such as handling and managing data/information from a particular source, or transforming data/information from one format into another format. The embodiments described herein are not to be construed as being limited for use with any particular type of server computer, and that any other suitable type of device for facilitating the exchange and storage of information may be employed instead.

Software embodiments of the illustrative example embodiments presented herein may be provided as a computer program product, or software, that may include an article of manufacture on a machine-accessible or non-transitory computer-readable medium (also referred to as "machine-readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions.

Therefore, the present invention also relates to a non-transitory computer readable storage medium for classifying an input image for new view synthesis in a 3D visual effect, comprising computer readable instructions that, when performed by the processor, causes the processor to perform the method described in this disclosure.

The techniques described herein are not limited to any particular software configuration. They may be applicable in any computing or processing environment. The terms "machine-accessible medium", "machine-readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The method presented in this invention was experimentally evaluated for image selection and ranking accordingly to the proposed image score. We evaluated the image score with quantitative results on the RealEstate10K dataset for new view synthesis and with qualitative results on a set of 3000 thousand public images from the Internet. We also evaluated the computational time required to generate the image score from an MPI representation.

In the qualitative evaluation, we considered the following image metrics: Structural Similarity Index (SSIM), Peak Signal-to-Noise Ratio (PSNR), and Learned Perceptual Image Patch Similarity (LPIPS). For this, we considered a set of 1500 images from the RealEstate10K dataset with paired source and target images at different viewpoints. We used a method for generating an MPI representation from a single image from the recent literature [4].

Figure 5:
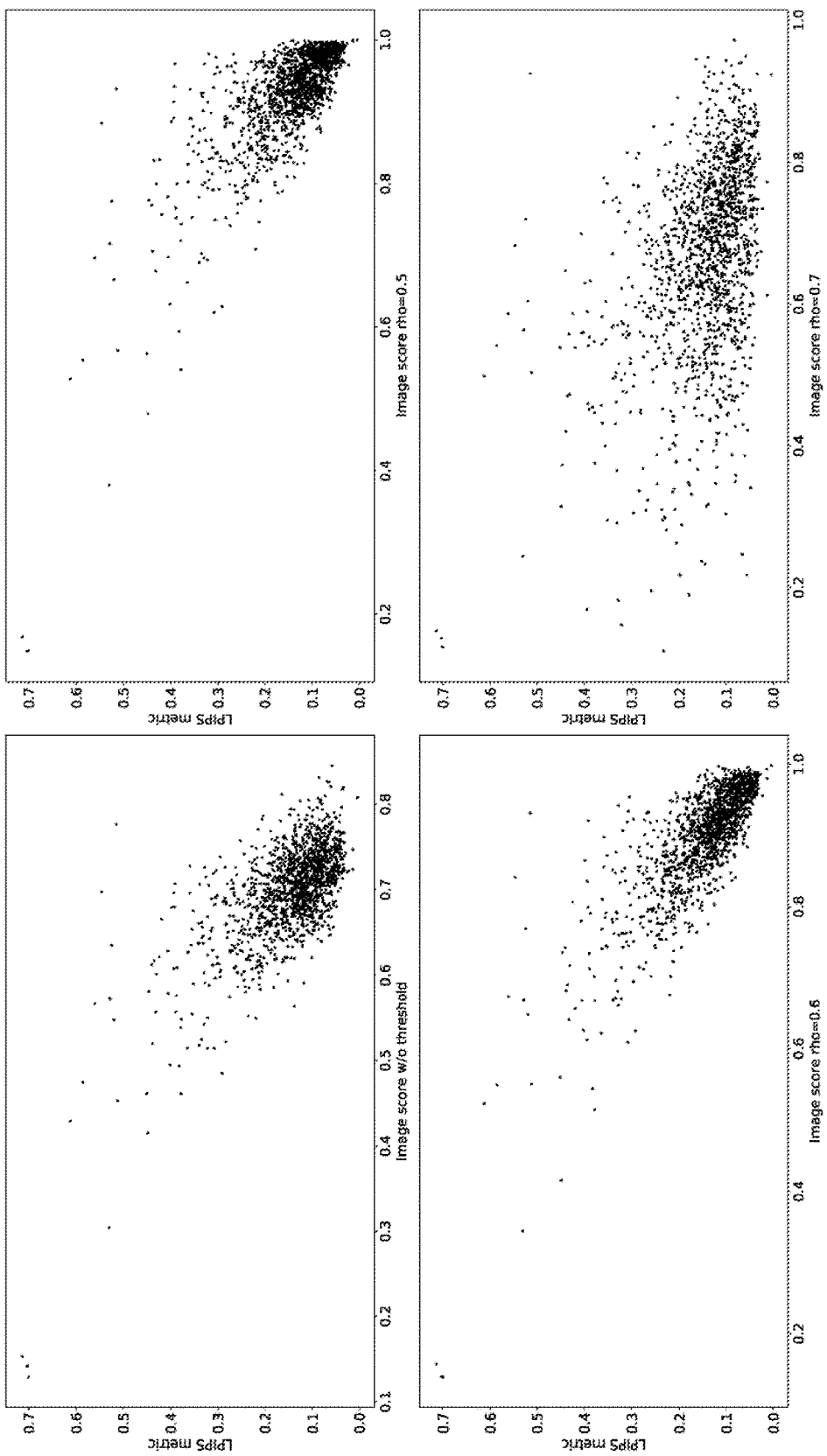
FIG. 5 shows the results on the RealEstate10K dataset considering the image score and the LPIPS metric for different values of ρ from a method for calculating the image score, according to an embodiment of the present invention.
Figure 6:
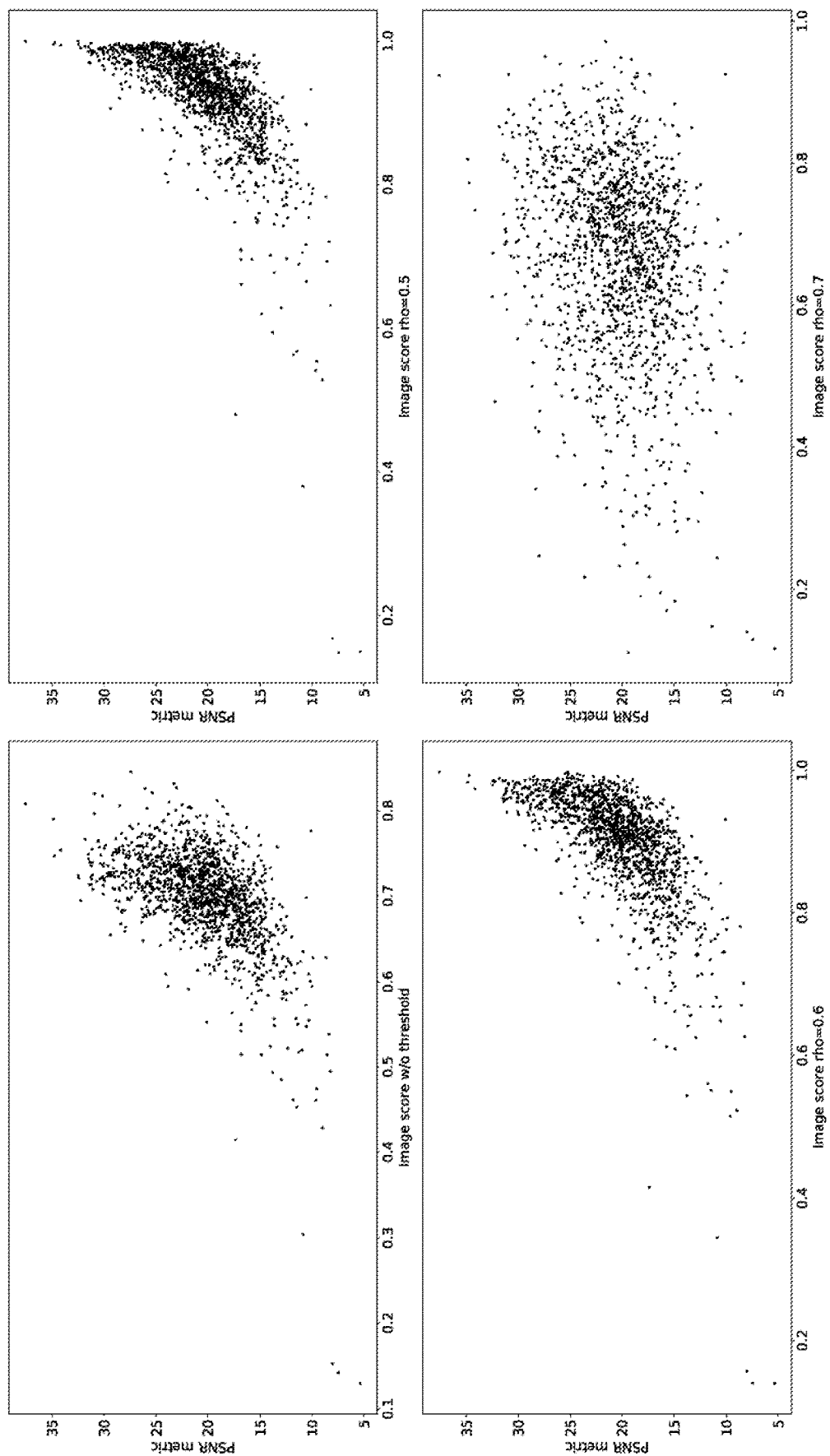
FIG. 6 shows the results on the RealEstate10K dataset considering the image score and the PNSE metric for different values of ρ from a method for calculating the image score, according to an embodiment of the present invention.
Figure 7:
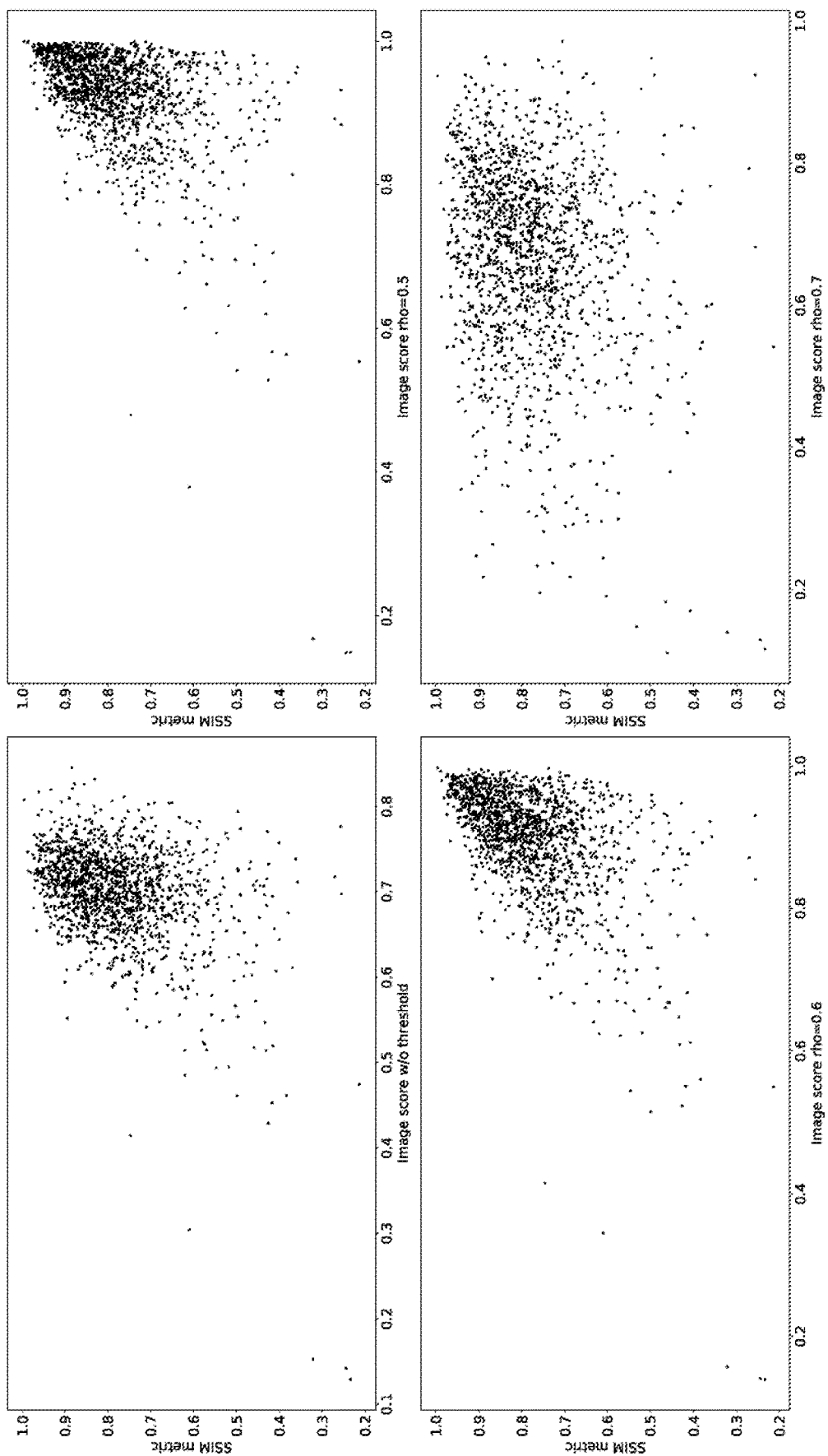
FIG. 7 shows the results on the RealEstate10K dataset considering the image score and the SSIM metric for different values of ρ from a method for calculating the image score, according to an embodiment of the present invention.

The results are shown in FIG. 5, FIG. 6, and FIG. 7. Specifically, FIG. 5 shows the distributions on RealEstate10K dataset considering the proposed image score (x-axis) and the LPIPS metric (the lower, the better), for different values of threshold $\rho$ (rho), FIG. 6 shows the distributions on RealEstate10K dataset considering the proposed image score (x-axis) and the PSNR metric (higher is better), for different values of $\rho$ (rho), and FIG. 7 shows the distributions on RealEstate10K dataset considering the proposed image score (x-axis) and the SSIM metric (the higher, the better), for different values of ρ (rho).

From the presented distributions, there is a clear correlation between the proposed image score (x-axis) and the quality of the image, for all the three metrics. In particular, the most important metric for visual effect, the LPIPS, shows a strong correlation for ρ=0.6, as can be seen in FIG. 5, bottom-left.

In addition to the results considering the metric distributions, we also evaluated the metrics on RealEstate10K considering the percentiles of the proposed image score, as presented in Table 1. From these results, we can see a consistent and significant improvement by using the proposed image score, e.g., raising from 0.697 to 0.843 in the SSIM metrics, considering the first and last percentiles. A similar improvement is observed in all the metrics, which indicates that the proposed image score is effective for selecting good image candidates for new view synthesis.

TABLE 1

Evaluation of the metrics SSIM, PSNR, and LPIPS on RealEstate 10K considering subsets of images divided accordingly to four percentiles based on the proposed image score.

| Metric/Percentile | 0%-25% | 25%-50% | 50%-75% | 75%-100% |
| --- | --- | --- | --- | --- |
| SSIM (↑) | 0.697 | 0.774 | 0.807 | 0.843 |
| PSNR (↑) | 16.396 | 19.233 | 21.562 | 24.675 |
| LPIPS (↓) | 0.237 | 0.142 | 0.117 | 0.081 |

Figure 8:
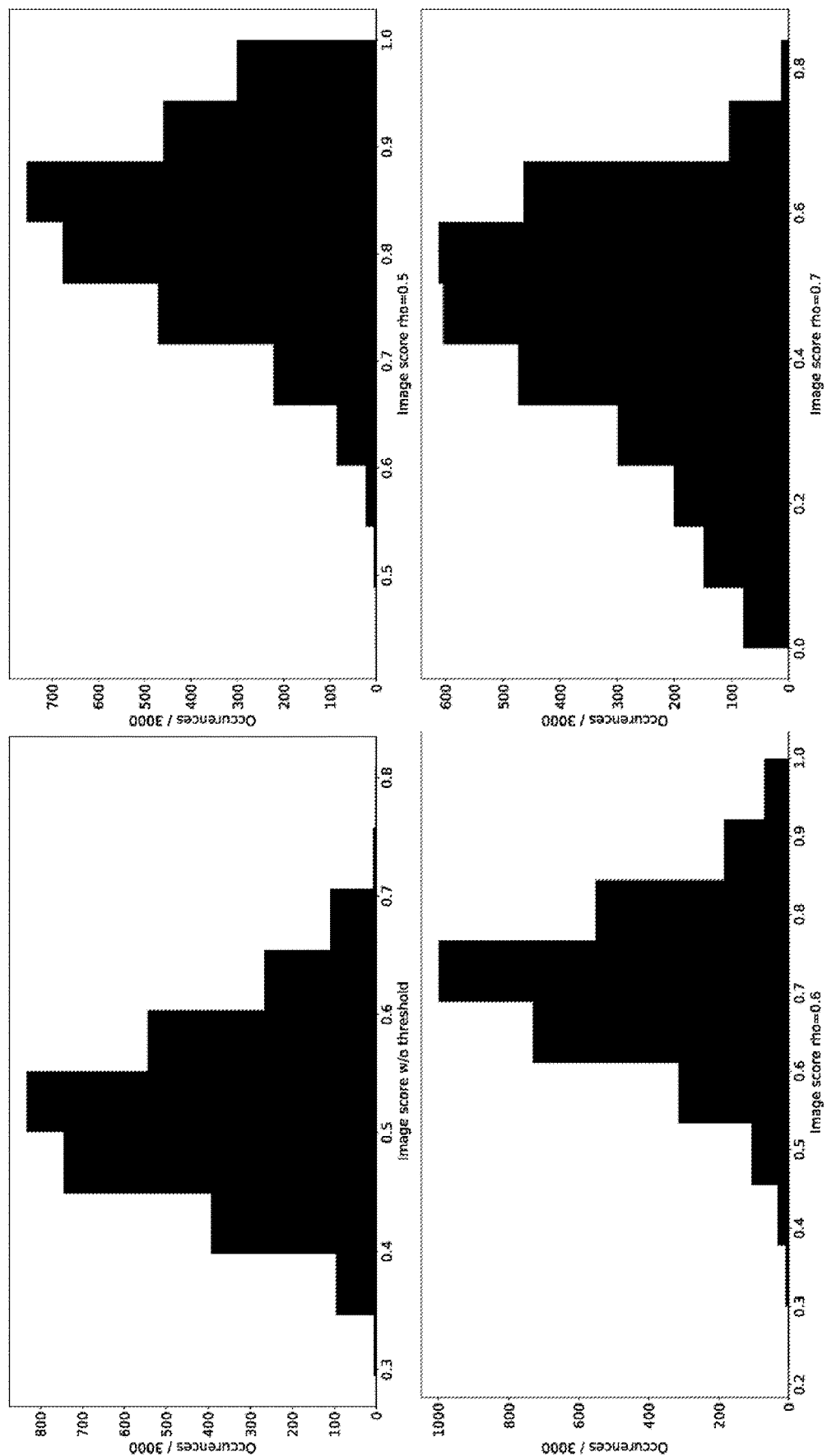
FIG. 8 shows the results of distribution histograms of the image score, considering a set of 3000 thousand images from the Internet, with different values of ρ from a method for calculating the image score, according to an embodiment of the present invention.

In order to show the capability of the method to generalize to a wide range of different types of images, we also evaluated the proposed image score on images obtained from the Internet. In FIG. 8, we show the resulting histogram of the proposed image score for a set of 3000 images from the internet, with different values of ρ (rho), which indicates that the method is capable of assigning different image scores to different images.

Figure 9:
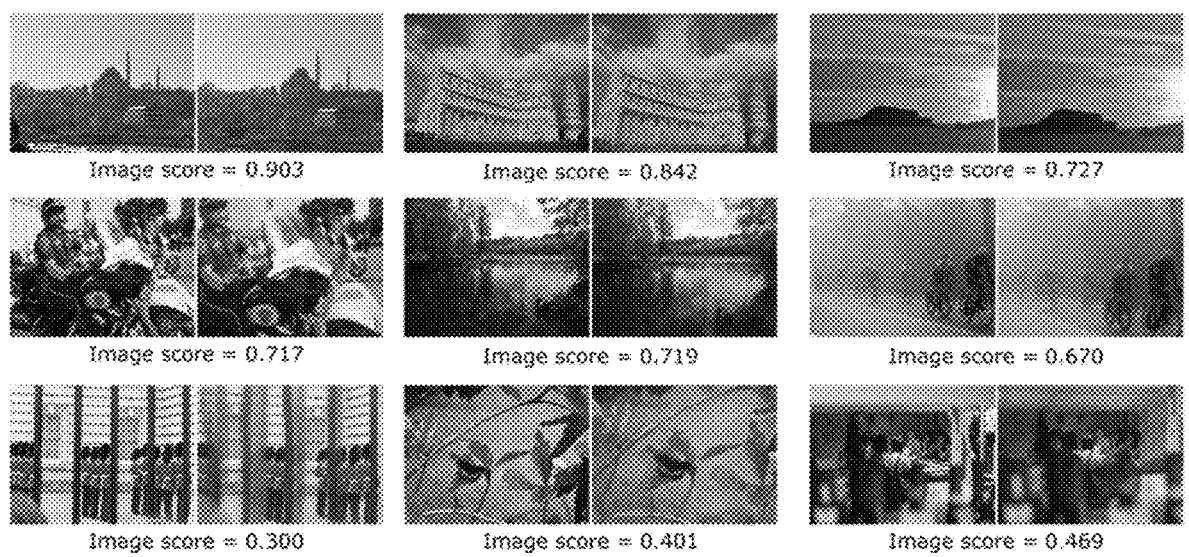
FIG. 9 shows some examples of qualitative results from the method proposed by the present invention, where different images with varied types of content are shown with their respective image scores computed by a method, according to an embodiment of the present invention.

Considering this experiment, qualitative results are shown in FIG. 9, on which different images with varied types of content are shown with their respective image scores computed by method proposed by the present invention. Each image is presented with their respective new view synthesized by a method from the literature based on the MPI representation, as shown for instance in FIG. 1, wherein the left images are the original picture, and the right ones are the new generated views. The lower is the image score, the more challenging is to synthesize a natural and visually plausible new view.

Finally, we also evaluated the present invention in terms of computational time. For this, we measured the time required to compute the image score for a given MPI representation. We implemented the method using C++ and the open computer vision library (OpenCV) and run the method on an Intel® Xeon® CPU E5-2670 @ 2.60 GHz processor. We computed MPI representations for 200 different images with alpha layers with resolution of 384×288 pixels and 32 image layers per sample. We also evaluated different 3D visual effects, and the computation time required by our method is, on average, 30 milliseconds per image frame, which allows real-time applications.

Therefore, the present invention solves the technical problem of helping the process of generating a good 3D visual effect from an image. Present invention is non-obvious for the following reasons: the problem that this invention intent to solve is ranking images for a given 3D visual effect, which has no prior work publicly available.

Although general image classification is a common problem in the literature, previous work are dedicated to classify image types or identify image content. Image ranking was also already explored in the literature, but the goal of previous work are to rank images considering a query, that could be another image, a text description, or audio signals, or combination thereof In the case of the present invention, the goal is to rank a set of images considering a given 3D visual effect, which has no previous work in the literature. It is important to highlight that classic image ranking algorithms will fail in the present task, since for new view synthesis, what is most relevant is the structure of the scene, and not the type of the image, considering only its visual content.

The present invention provides a new feature related to new view synthesis from a single image. This new feature cannot be achieved with any combination of previous methods in an obvious way, since the problems of selecting a good image for generating a 3D visual effect or even selecting a good visual 3D effect for a given image were not yet been considered by previous work While various example embodiments and use of the technique have been described above, it should be understood that they have been presented by way of example, and not limitation. It will be apparent to persons skilled in the relevant art(s) that various changes in form and detail can be made therein.

What is claimed is:

1. A computer implemented method for classifying an input image for a new view synthesis in a 3D visual effect, the method comprising:
    creating an image representation using the input image of a size of H×W, the image representation including a set of target views based on an input 3D visual effect; and
    computing an image score $s_t$ for the set of target views based on a number of non-occluded pixels in the set of target views, the image score indicating suitability of the input image for the new view synthesis in the 3D visual effect,
    wherein the image representation is a multiplane image (MPI) representation defined by a set of D planar image layers, each layer encoded as an RGB-alpha image at a distance $d_i$ with respect to a viewpoint, defined by:

$$\{(c_i, \alpha_i)\}_{i=1}^{D} = f_\theta(I),$$

where $c_i$ and $\alpha_i$ correspond to color and alpha values of the i-th image layer, $f_\theta$ represents a generic method that produces an MPI from the input image I,
    wherein the MPI representation is rendered to a source viewpoint and to new viewpoints based on a warping operation and a compositing operation,
    wherein the set of target views is defined by $V=\{v_1, v_2, \ldots, v_t\}$, where t is a number of considered target views,
    wherein the warping operation is defined by a warping function based on a depth of each image plane applied individually for color and alpha channels, as defined by:

$$c'_i = W_{v_s, v_t}(d_i, c_i),$$

$$\alpha'_i = W_{v_s, v_t}(d_i, \alpha_i),$$

where $c'_i$ and $\alpha'_i$ correspond to the color and alpha values of the i-th image layer after warping from a source viewpoint $v_s$ to a target viewpoint $v_t$, and W is a generic warping function, based on planar homography for the MPI representation, wherein the image score is computed based on an over composite operation of the warped alpha layers, defined by:

$$M_t = \Sigma_{i=1}^D (\alpha'_i \Pi_{j=i+1}^D (1-\alpha'_j)),$$

where $M_t$ is a composite alpha that represents non-occluded pixel values, wherein the computing of the image score $s_t$ comprises calculating a metric for non-disocclusion by the following equation:

$$s_t = \frac{\sum_{k=1}^{H \times W} (M_t(k) \geq \rho)}{H \times W},$$

wherein $\rho$ is an alpha threshold to decide whether or not an alpha value is considered as occluded or non-occluded pixel, wherein $\rho$ is a normalized value between [0, 1].

2. The computer implemented method according to claim 1, wherein the image representation is created from the input image and from an input depth map.

3. The computer implemented method according to claim 1, wherein after the warping operation to the target viewpoint, a resulting MPI representation is rendered by an over composite operation, defined by:

$$I_t = \Sigma_{i=1}^D (c'_i \alpha'_i \Pi_{j=i+1}^D (1-\alpha'_j)),$$

where $I_t$ is a new rendered target view.

4. The computer implemented method according to claim 1, wherein
the computing of the image score $s_t$ comprises counting the number of non-occluded pixels in the target views of the input image.

5. The computer implemented method according to claim 1, wherein the image score is calculated by:

$$L(\alpha, V) = \left(\frac{1}{|V|} \sum_{k \in V} s_t\right) \min(s_t | t \in V),$$

wherein V is the set of target views; $s_t$ is a metric for non-disocclusion, and
wherein L is the resulting score in a scalar value in the interval [0, 1].

6. The computer implemented method according to claim 1, wherein the method further comprises:
establishing a threshold value for the image score, wherein the input image is suitable for a given 3D visual effect if its image score is higher than the threshold value.

7. The computer implemented method according to claim 1, wherein the input image comprises a plurality of input images,
wherein the computing of the image score comprises computing image scores for the plurality of input images,
the method further comprising:
ranking the plurality of input images based on their corresponding image scores.

8. The computer implemented method according to claim 7, the method further comprising:

selecting at least one best image based on the ranking of the plurality of input images, and
generating a 3D visual effect animation for the selected images.

9. The computer implemented method according to claim 7, the method further comprising
establishing a threshold value for the image score, wherein input images are suitable for a given 3D visual effect if its imaging score is higher than the threshold value, and
generating a 3D visual effect animation for all the input images having an image score higher than the threshold value.

10. A computer implemented method for classifying an input image for a new view synthesis in a 3D visual effect, the method comprising:
creating an image representation using the input image of a size of H×W, the image representation including a set of target views based on an input 3D visual effect; and
computing an image score $s_t$ for the set of target views based on a number of non-occluded pixels in the set of target views,
wherein the image score indicates suitability of the input image for the new view synthesis in the 3D visual effect,
wherein a plurality of candidate 3D visual effects are associated with the input image, wherein for each candidate 3D visual effect the input image is used to create an image representation comprising a set of target views based on the input 3D visual effect,
wherein
the computing of the image score comprises computing image scores for the input image using each of the candidate 3D visual effects, and
ranking the plurality of candidate 3D visual effects based on corresponding image scores.

11. The computer implemented method according to claim 10, wherein the method further comprises:
selecting a candidate 3D visual effect with a highest image score, and
generating a 3D visual effect animation selected for the input image.

12. The computer implemented method according to claim 10, the method further comprising:
displaying for a user at least one best candidate 3D visual effect based on the ranking of the plurality of candidate 3D visual effects,
selecting, from an input of the user, a candidate 3D visual effect among the displayed at least one best candidate 3D visual effect, and
generating a 3D visual effect animation selected by the user for the input image.

13. The computer implemented method according to claim 10, the method further comprising:
establishing a threshold value for the image score, wherein the plurality of candidate 3D visual effects are suitable for the input image if its image score is higher than the threshold value,
displaying for a user the 3D visual effect of the input image for all candidate 3D visual effects having an image score higher than the threshold value,
selecting, from the input of the user, a candidate 3D visual effect among the displayed candidate 3D visual effect, and
generating a 3D visual effect animation selected by the user for the input image.

14. The computer implemented method according to claim 10, the method further comprising:
- establishing a threshold value for the image score, wherein the candidate 3D visual effects are suitable for the input image if its image score is higher than the threshold value, and
- generating 3D visual effect animations for all the suitable candidate 3D visual effects for the input image.

15. A system for classifying an input image for new view synthesis in a 3D visual effect, comprising:
- a processor; and
- a memory including computer readable instructions that, when executed by the processor, causes the processor to perform the method as defined in claim 10.

16. A non-transitory computer readable storage medium which stores computer readable instructions that, when executed by a processor, causes the processor to perform the method as defined in claim 10.

\* \* \* \* \*